Oct. 27, 1936.    W. RAVESTEIN    2,059,030
RESILIENT VEHICLE WHEEL
Filed July 17, 1935
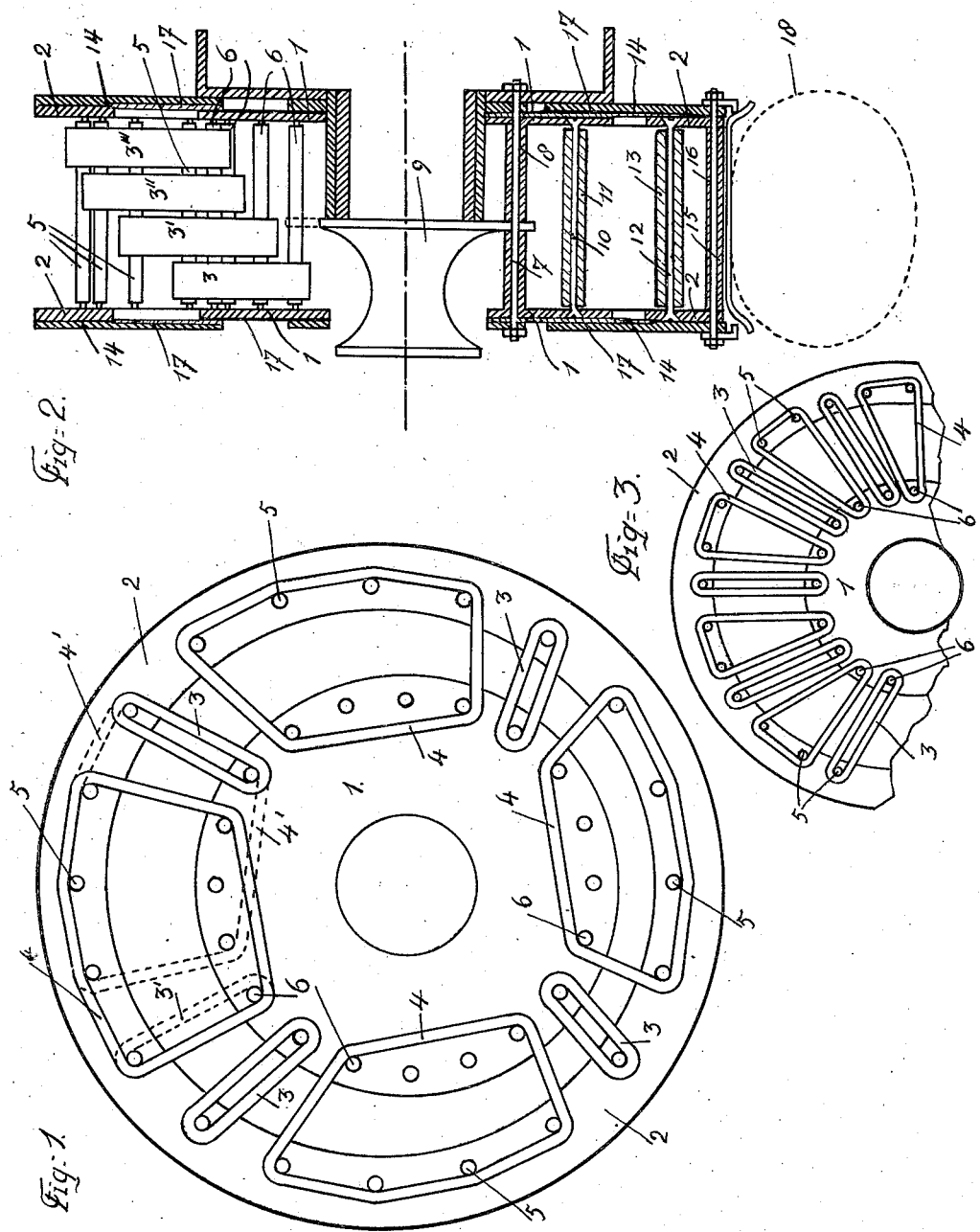
INVENTOR
Willem Ravestein
BY Francis E. Bayce
ATTORNEY Patented Oct. 27, 1936

2,059,030

UNITED STATES PATENT OFFICE 2,059,030

RESILIENT VEHICLE WHEEL

Willem Ravestein, Monster, Netherlands; Maria Anna Philippina Ravestein, executrix of said Willem Ravestein, deceased, assignor to N. V. Handelsvereenizing V. H. Fa. Bessel-Kok, Amsterdam, Netherlands, a corporation of the Netherlands Application July 17, 1935, Serial No. 31,829
In the Netherlands August 1, 1934

2 Claims. (Cl. 152—36)

This invention relates to a resilient vehicle wheel, more particularly to a resilient wheel comprising an outer rim and a central hub connected to each other by resilient members in the form of closed rubber rings placed around guiding members provided on the rim and the hub respectively.

The primary object of this invention is to provide a satisfactory vehicle wheel of the kind set forth affording a high degree of resilience and ensuring a soft spring action at normal velocities of the vehicle and when normal shocks appear, whereas too great oscillations or deflections are automatically and immediately damped so as to prevent the central hub of the wheel to strike against the wheel rim.

According to the invention and with this object in view the rubber rings connecting the rim and the hub to each other are arranged in two sets, the rings of the one set being more elastic and when mounted on the wheel proportionally stretched to a higher degree than those of the second set, the rings of this second set being arranged so as to prevent too great radial movement or deflection of the hub with regard to the wheel rim.

The more elastic rings serve to obtain a supple spring action under normal circumstances. They are initially stretched to such an extent that they are capable to carry the weight and load of the vehicle with a normal deflection of the wheel axis, but they are still supple and elastic enough to be sufficiently extensible when the vehicle is driving and shocks may occur. The less elastic rings are also placed under initial tension, so that they carry the weight of the vehicle as well, but their tension is such that the elasticity of the whole resilient wheel under normal conditions of driving (normal velocity and good condition of the road) is determined by the first mentioned rings, which, in consequence of their being proportionally more stretched, initially present a greater stiffness. The less elastic rings have to perform their principal function when heavy shocks or jerks occur, so as to prevent a definite maximal deflection of the hub with regard to the wheel rim. While at that predetermined maximal deflection the more elastic rings would still have a normal percentage of stretching and would therefore not be able to prevent further deflection, the less elastic rings are at the same deflection proportionally stretched to such a degree, that very great stresses would be necessary to stretch these rings still further. Consequently they immediately damp any undesired large deflection or oscillation.

Thus the wheel structure according to the invention presents the great advantage that, although an effective, smooth and agreeable resilience is assured when driving, too large oscillations or sagging movements are effectively prevented. The action of the less elastic rings as damping means or shock absorber is especially of great importance, because also by resonance too great oscillations or deflections cannot occur.

The greater elasticity of the one set of rings may be obtained by making these rings longer than the other ones, or by decreasing their width or thickness. Or they may be composed of a more elastic material, or a combination of these measures may be applied.

According to a preferred embodiment of the invention the wheel structure may be such that each ring of the set of less elastic rings is passed around one guiding member on the rim and one guiding member on the hub, whereas each ring of the set of more elastic rings is arranged around a greater number of guiding members. This enables in an easy way to mount the more elastic rings on the wheel with a greater percentage of tension than the other rings.

The accompanying drawing diagrammatically shows by way of example a preferred embodiment of the present invention.

Fig. 1 shows a resilient wheel in side elevation, the side plates or covers of the wheel being removed to show the rubber connecting rings.

Fig. 2 shows the wheel in vertical section through the wheel axis, the upper half of the figure showing the arrangement of the less elastic rings and the lower part showing the mutual connexion of the different plates of the wheel.

Fig. 3 shows part of the wheel in side elevation, but contrary to Fig. 1 the more elastic rings have been passed around three instead of around six guiding members.

Referring to Fig. 1 the central or hub part of the wheel has been denoted by the reference 1 and the outer or rim part by the reference 2. These parts are connected to each other by means of closed rubber bands or rings 3 and 4, which have been passed around guiding pins 5, 6. The pins or guiding members 5 are secured at equi-distant points of the rim part 2 and the same number of pins 6 is fixed to the hub part 1 of the wheel. The rings 3, which are less elastic than the rings 4 (when all the rings are made of the same rubber material, this may be e. g. obtained by making the rings 3 in unstretched condition shorter than the rings 4), are guided around one pin 5 and one pin 6, whereas the longer rings 4 are passed around four pins 5 and two pins 6. The long rings 4, as well as the short rings 3, are in a stretched condition when mounted on the wheel. The dimensions of the rings are such that initially the rings 4 are stretched to a higher proportional degree than the rings 3. In Fig. 1 is shown somewhat exaggerated the deflection of the hub under the influence of the weight of the vehicle and its load. The upper connecting rings are then stretched to a higher degree than the lower ones. The initial tension of the rings is such that when the vehicle is loaded, the rings 4 may still be stretched rather easily, so that these rings assure a soft and good spring action when the vehicle is driving under normal conditions (normal speed and good state of the roads). Under these circumstances the rings 3 which, measured in percents of their length, have been stretched not so much as the rings 4, cannot affect the resilience of the wheel, which is determined by the rings 4, presenting a greater stiffness under such conditions. When, however, heavy shocks would be imparted to the wheel in consequence of a higher speed or a bad condition of the road, the shorter rings 3 come into action and prevent too great deflections of the wheel axis. This is due to the fact that at the greatest admissible deflection these rings become proportionally (i. e. in percents of their length) stretched to such a degree that they offer a very great resistance to any further stretching, whereas the long rings 4 may still be further stretched rather easily. In other words, at this moment the short rings 3 have passed the inclining part of their stretching-curve and begin to work in the nearly horizontal upper part thereof.

In Fig. 1 alternatively a long and a short ring have been placed beside each other. It is evident that instead thereof one may arrange two or more short rings beside each other, followed by one long ring.

In the upper part of Fig. 2 is shown, in what manner a number of ring sets may be provided behind each other in the direction of the wheel axis, each set being arranged in a vertical plane. In order to obtain as much as possible a uniform distribution of the different tension members over the circumference of the wheel, the corresponding rings in the different sets are not in register or alignment in transverse direction, but are staggered preferably in regular formation. This is shown only for the short rings in Fig. 2. The ring 3 corresponds with the arrangement of the short rings in Fig. 1. The ring 3' in the next set passes around adjacent guiding pins, the ring 3'' in the third set is staggered over one guiding pin further, and the ring 3''' over a guiding pin still further along. In Fig. 1 the position of one short ring 3' and one long ring 4' of the next set has been indicated by dotted lines.

It results from Fig. 2 that the hub part of the wheel consists of two plates 1, which are connected to each other and to the hub 9 by means of bolts 7 (see the lower part of Fig. 2) and distance-pieces 8. The pins 6, guiding the rubber rings, are formed by bolts 10 fixed in the hub plates 1 and surrounded by metal bushes 11 rotatably mounted on the said bolts 10.

The rim part is composed of the plates 2 carrying the pins 5 for the rubber rings, which pins 5 are formed by bolts 12 with rotatable bushes 13 mounted thereon. Outside of the plates 2 side-plates 14 have been provided. The plates 2 and 14 are connected to each other by means of bolts 15 and distance-pieces 16.

When the rim part and the hub part of the wheel are moved radially with regard to each other, the side plates 14 sufficiently engage the hub plates 1, so as to prevent a relative displacement of the hub part and rim part in transverse direction. The side plates 14 at their inner faces and the hub plates 1 at their outer faces are provided with a special covering 17. This covering is composed of fibre impregnated with paraffin or a grease of high melting-point. This enables the said plates to be displaced relatively to each other without the aid of oil lubricating. Oil lubricating has appeared to be unsatisfactory and has moreover the disadvantage that the rubber rings may be spoiled by the oil.

The wheel tyre 18 shown in Fig. 2 is a solid rubber tyre, but it may be replaced by a pneumatic tyre.

Fig. 3 shows another embodiment of the wheel structure. According to this figure the more elastic rings 4 pass around three pins only, whereas the less elastic rings 3 are mounted in the same manner as in Fig. 1. In this construction the number of pins 5 at the rim part is greater than the number of pins 6 at the hub part.

The resilient wheel according to the invention is especially adapted for motor cars and like vehicles, but it may be applied to other vehicles and bicycles as well. When using the resilient wheel according to the invention, the normal suspension-springs of the vehicle may be omitted, but said springs may also be maintained with advantage; the resilient wheels then improve the spring action of the vehicle and they especially prevent too great oscillating movements caused by the long vehicle springs.

Having thus described my invention, what I claim is:

1. A resilient vehicle wheel comprising an outer rim and a central hub, guiding members carried on said rim and hub respectively, two sets of rubber rings disposed around said guiding members and connecting said rim and hub, the rubber rings of one set being more elastic and in mounted condition pre-stretched to a higher proportional degree than those of the second set, the elasticity and the pre-stretching conditions of the rings of said second set being such as to prevent too great radial movements of the hub with regard to the wheel rim.

2. A resilient vehicle wheel as claimed in claim 1, in which each of the less elastic rings is mounted around one guiding member on the rim and one guiding member on the hub, whereas each of the more elastic rings is arranged around a greater number of guiding members.

WILLEM RAVESTEIN.